(12) United States Patent
Gierl et al.

(10) Patent No.: US 7,277,686 B2
(45) Date of Patent: Oct. 2, 2007

(54) ANTENNA AND FREQUENCY DIVERSITY RECEIVING APPARATUS

(75) Inventors: Stefan Gierl, Karlsruhe (DE); Joachim Wietzke, Karlsruhe (DE); Erich Geiger, Kaempfelbach (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 364 days.

(21) Appl. No.: 10/890,510

(22) Filed: Jul. 12, 2004

(65) Prior Publication Data

US 2005/0054304 A1 Mar. 10, 2005

(51) Int. Cl.
*H04B 1/06* (2006.01)
*H04B 7/00* (2006.01)
*H04B 17/02* (2006.01)
*H04B 1/18* (2006.01)

(52) U.S. Cl. ............... 455/277.1; 455/275; 455/135; 455/161.3; 455/277.2

(58) Field of Classification Search ........ 455/132–136, 455/188.1, 191.1, 272, 277.1, 277.2
See application file for complete search history.

(56) References Cited

U.S. PATENT DOCUMENTS

| | | | | |
|---|---|---|---|---|
| 5,159,707 A | | 10/1992 | Mogi et al. | 455/134 |
| 5,303,400 A | * | 4/1994 | Mogi | 455/186.1 |
| 5,313,660 A | * | 5/1994 | Lindenmeier et al. | 455/135 |
| 5,345,602 A | * | 9/1994 | Wiedemann et al. | 455/137 |
| 5,557,603 A | * | 9/1996 | Barlett et al. | 370/228 |
| 5,710,789 A | * | 1/1998 | Snodgrass et al. | 375/134 |
| 6,141,536 A | * | 10/2000 | Cvetkovic et al. | 455/45 |
| 6,236,844 B1 | * | 5/2001 | Cvetkovic et al. | 455/273 |
| 6,611,677 B1 | * | 8/2003 | Lindenmeier et al. | 455/135 |
| 6,792,258 B1 | * | 9/2004 | Nokes et al. | 455/277.2 |
| 7,034,893 B2 | * | 4/2006 | Liu et al. | 348/614 |
| 7,034,898 B1 | * | 4/2006 | Zahm et al. | 348/725 |
| 7,120,404 B2 | * | 10/2006 | Gierl | 455/132 |
| 2002/0141374 A1 | | 10/2002 | Boetzel et al. | 370/343 |
| 2002/0168955 A1 | * | 11/2002 | Wildhagen | 455/277.1 |

FOREIGN PATENT DOCUMENTS

| | | | |
|---|---|---|---|
| DE | 19739898 | | 3/1999 |
| DE | 19905157 | | 8/2000 |
| DE | 19929071 | | 12/2000 |
| JP | 6-204926 | * | 7/1994 |
| WO | WO 01/50648 | | 7/2001 |

* cited by examiner

*Primary Examiner*—Duc M. Nguyen
(74) *Attorney, Agent, or Firm*—O'Shea, Getz & Kosakowski, P.C.

(57) ABSTRACT

An apparatus determines an optimal antenna and frequency combination by selecting the optimal antenna from among a plurality, N, of antennas associated with a receiver and also selects the optimal frequency from among a plurality, M, of alternative receiving frequencies transmitted from a transmitter. This is achieved by determining all N×M possible antenna/frequency combinations, by determining the received signal quality at each combination, by comparing the N×M received signal qualities, and by selecting the one antenna/frequency combination having the optimal received signal quality.

17 Claims, 2 Drawing Sheets

ANTENNA AND FREQUENCY DIVERSITY RECEIVING APPARATUS

BACKGROUND OF THE INVENTION

The present invention relates generally to an antenna diversity system, and in particular to selecting one of a plurality of antennas and one of a plurality of alternative receiving frequencies to determine a desirable antenna and frequency combination.

An antenna and frequency diversity receiving apparatus typically includes a receiver connected to one of several spatially separated antennas and tunable to one of several alternative receiving frequencies. Such an apparatus is oftentimes used with a mobile receiver, for example, a radio receiver in a motor vehicle. As such, a plurality of antennas are integrated within the windows of the motor vehicle. A selection circuit selects according to prescribable criteria one of the antennas to be connected to the receiver (e.g., the antenna receiving a signal with the greatest field strength). Signals to be received may emanate from various types of transmitters, for example, a radio broadcasting apparatus, a television broadcasting apparatus or telephone equipment. An evaluation circuit selects one of the alternative receiving frequencies to which the receiver will be tuned. In order to achieve the best possible signal reception, it is necessary to determine the best antenna and frequency combination.

What is needed is a technique for determining the best antenna and frequency combination as quickly and reliably as possible from both the plurality of available antennas and the plurality of available receiving alternative frequencies.

SUMMARY OF THE INVENTION

An optimal antenna is selected from among a plurality (e.g., N) of antennas associated with a receiver and the optimal frequency is selected from among a plurality, M, of alternative receiving frequencies transmitted from a transmitter. This is achieved by determining N×M possible antenna/frequency combinations, by determining the received signal quality at each combination, by comparing the N×M received signal qualities, and by selecting the one antenna/frequency combination having the best received signal quality.

Each of the N antennas is connected to the input of a corresponding Intermediate Frequency (IF) circuit stage, while the output of each IF stage is connected to one of the corresponding N inputs of a multiplex switch. The output of the multiplex switch is connected to an analog-to-digital converter that provides digitized data to a digital signal processor (DSP), the output of which is connected to a demodulator which can be part of the DSP or separated therefrom. Each IF stage provides a signal representing the quality of the transmitted signal received by the associated antenna, the N quality signals are provided to the DSP. The DSP provides one or more frequency control signals to a corresponding controlling input of each IF stage for setting the receiving frequency thereof. A controlling output of the DSP is connected with the controlling input of the multiplex switch for selecting the antenna with the optimal received signal quality to pass from the associated IF stage through the multiplex switch to the DSP.

The received signal quality from each of the N antennas can be measured at each of the M available receiving frequencies. Therefore, all N×M possible antenna frequency combinations are accounted for and the received signal quality will be determined for each of these combinations. Then the one antenna/frequency combination that provides the best received signal quality will be selected.

Each of the N IF stages will be tuned to each of the M receiving frequencies, This can occur such that all of the IF stages are tuned to the same one of M receiving frequencies at any one moment in time. In the alternative, the IF stages can be tuned to different ones of the M receiving frequencies at any one moment in time. The receiving quality will be determined for each receiving frequency and analyzed in the digital signal processor to determine the antenna/frequency combination having the best received signal quality. The digital signal processor switches the selected antenna to the input of the analog-to-digital converter via the multiplex switch and tunes the corresponding IF stage to the optimal receiving frequency found.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
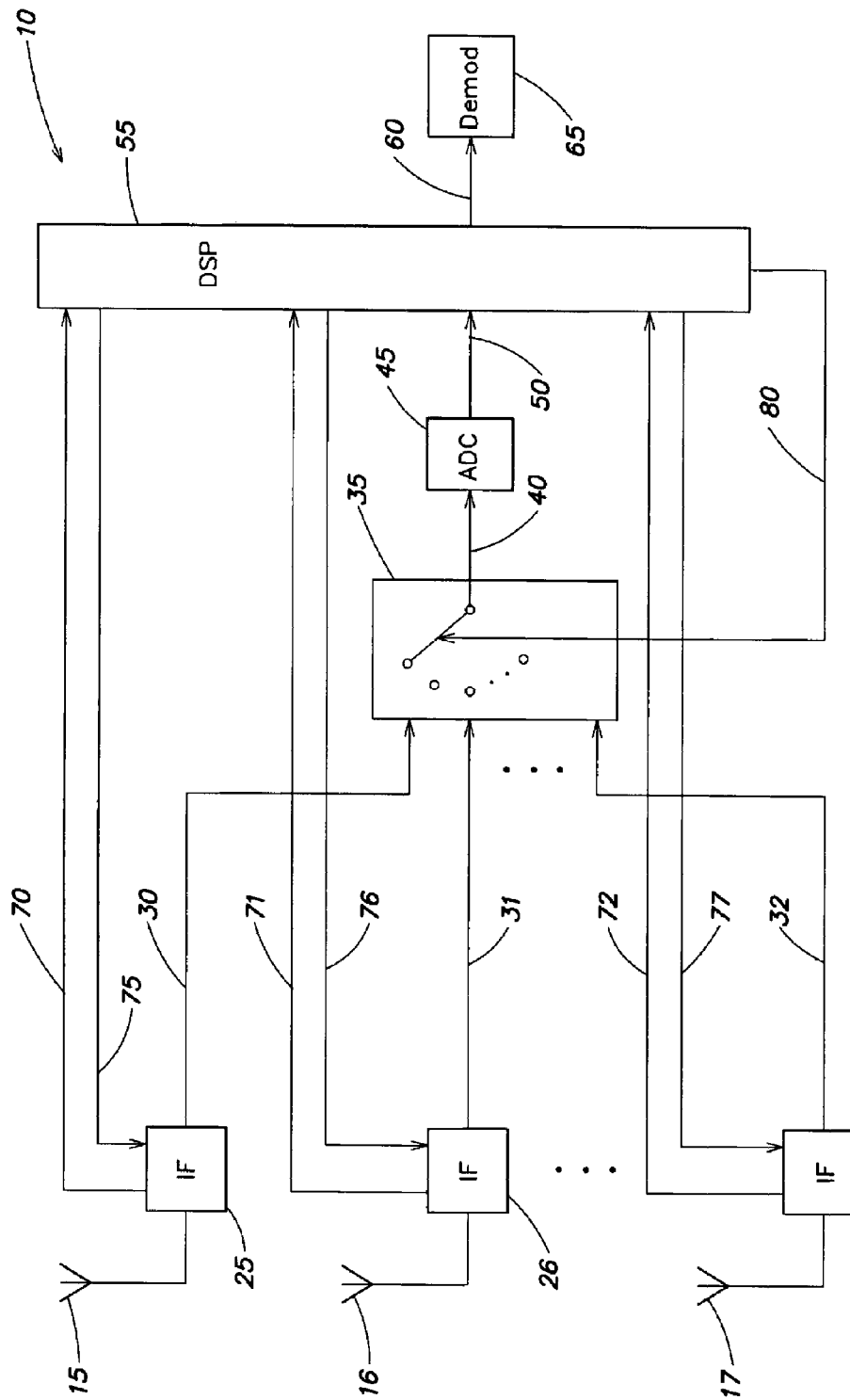
FIG. 1 is a block diagram illustration of an antenna diversity system.

Referring to FIG. 1, an antenna diversity apparatus 10 includes a plurality (e.g., N) of antennas 15-17 which each provides an associated received signal to a corresponding IF (Intermediate Frequency) stage 25-27, respectively. Each IF stage 25-27 may comprise well-known components, for example, a mixer, a phase loop control, and an oscillator. Each of the IF stages provides an IF output signal (e.g., lines 30-32) to a multiplex switch 35. The switch 35 provides a switch output signal on a line 40, indicative of a selected one of the IF input signals on the lines 30-32. The switch output signal on the line 40 is input of an analog-to-digital converter (ADC) 45 which provides a digitized signal on a line 50 to a digital signal processor (DSP) 55. The DSP 55 provides a DSP output signal on a line 60 to a demodulator 65.

Each of the plurality of IF stages 25-27 provides an associated quality signal on a line 70-72, respectively, to the DSP 55. Each quality signal indicates the quality of the received signal from the corresponding antenna 15-17. For example, the quality may represent the field strength of the signals received by the antennas 15-17 from the various transmitters. The DSP 55 provides frequency control signals on lines 75-77 to an associated one of each of the IF stages 25-27, respectively. In addition, the DSP 55 also provides a switch control signal on line 80 to the switch 35.

The DSP 55 tunes each of the N IF stages 25-27 to each of the M alternative receiving frequencies, so that all N×M possible antenna/frequency combinations can be determined. Therefore, N×M quality signals are generated and compared with each other in the DSP 55.

The best receiving can be ascertained, for example, in a well-known manner by quality evaluation of the IF quality signals 70-72 for the alternative receiving frequencies. In the analysis, the DSP 55 ascertains, with the help of the N×M quality signals, the one antenna/frequency combination that provides the best received signal quality. The DSP 55 then provides the switching control signal on the line 80 in order to switch the switch 35 to the selected optimal antenna, and the DSP 55 also provides the frequency control signal on a line 75-77 to tune the corresponding IF stage to the receiving frequency found. The DSP 55 then receives the signal 50 from the selected one antenna/frequency combination with that signal 50 being distinguished by the best received signal quality among all possible antenna/frequency combinations.

A feedback of the IF signals is not necessary, because the receiving quality will be ascertained already in the IF stages 25. The digital processing of the IF signal within the DSP 55 provides the advantage that generating of a returning signal will be comparatively easy. Furthermore, interferences caused by returning operations can be suppressed or resampled in an easy manner. In a preferred embodiment, the IF stages 25-27 are integrateable in a module as integrated circuits. Preferably, the IF stages 25-27, the switch 35, the analog-to-digital converter 45, the digital signal processor 55, and the demodulator 65 are integrated in a single module.

Figure 2:
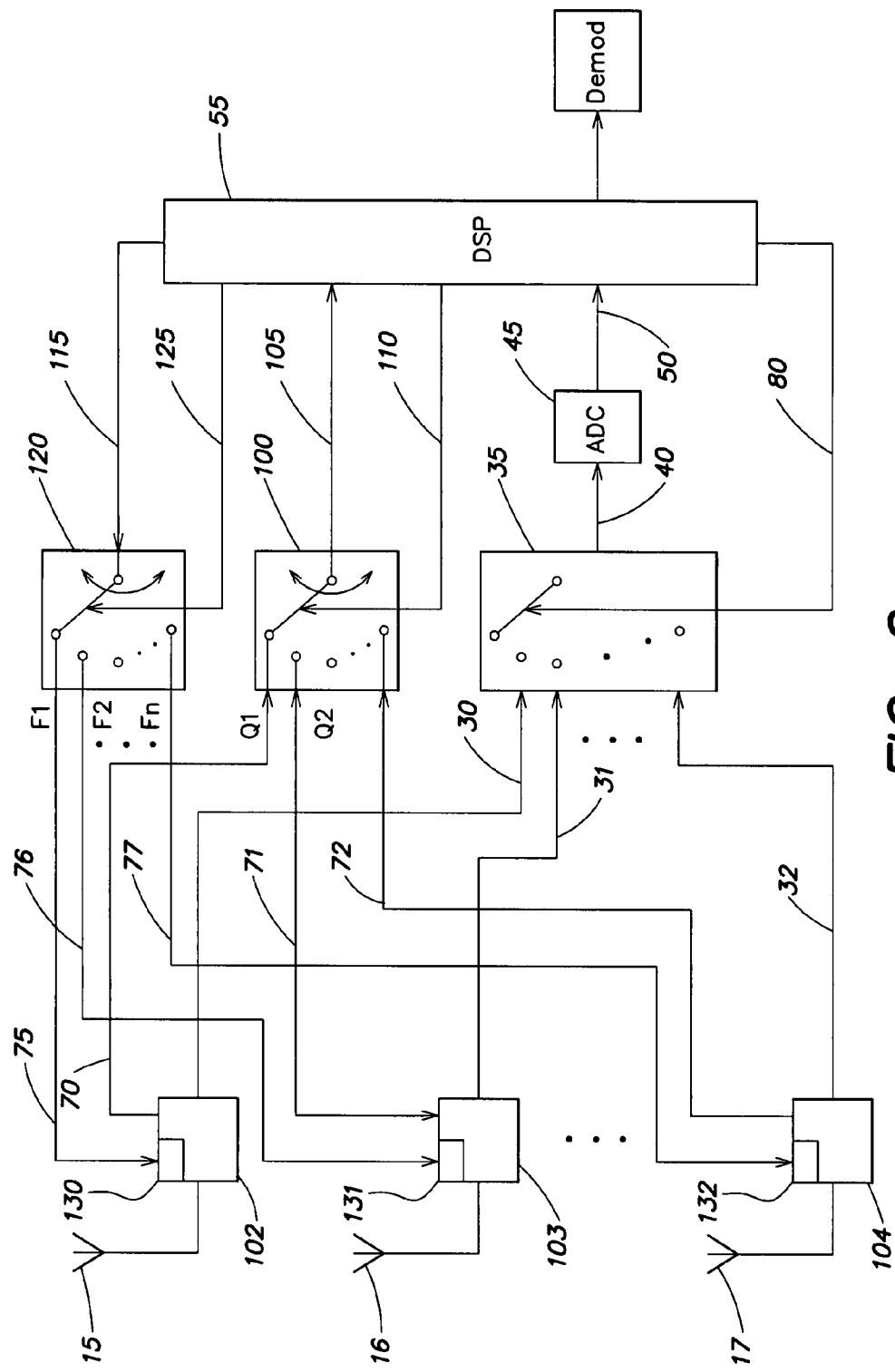
FIG. 2 is a block diagram of the system of FIG. 1 with alternative embodiments of certain features.

In FIG. 2, the plurality, N, of quality signals 70-72 are input to a second multiplex switch 100. The output of the second multiplexer 100 on a line 105 is input to the DSP 55. The DSP 55 controls the second multiplexer 100 by a signal on a line 110. In this alternative embodiment, it is not necessary to provide the DSP 55 with a plurality, N, of quality signal inputs.

According to another aspect, a frequency output signal on a line 115 is provided by the DSP 55 to a third multiplex switch 120. To control the third multiplexer 120, the DSP 55 provides a signal on a line 125 to the multiplexer 120. This control signal 125 controls the operation of the third multiplexer 120 to switch the frequency signal 115 to the corresponding IF stages 102-104.

Each IF stage 102-104 includes memory 130-132 for storing the frequency value to be used by the corresponding IF stage 102-104 and sent by the DSP 55 until receipt of another frequency value from the DSP 55. Therefore, it is possible to use a frequency value determined as a best frequency value in an earlier determining cycle.

The third multiplexer 120 may instead comprise a frequency splitter that splits the frequency output signal on the line 115 from the DSP 55 into a plurality of frequency lines, thereby connecting the frequency signal on the line 115 to the frequency inputs of the IF stages 102-104. In this embodiment, the DSP would provide all of the IF stages 102-104 at one moment with the same frequency value.

Therefore, the DSP 55 provides a frequency control output signal 75-77 to each one of the plurality, N, of IF stages 102-104, respectively, via a plurality of N frequency output signals from the DSP 55 or, alternatively, via only one frequency output signal on the line 115 from the DSP 55 and a frequency control device, i.e., the third multiplexer 120. The frequency control device may be the third multiplexer 120 or only a simple line splitter.

As described above, it is possible to provide a plurality, N, of frequency output signals to the corresponding plurality, N, of IF stages, wherein each IF stage has a single or the same frequency value. Thus, within a plurality, M, of steps every IF stage will be provided with the M possible frequency values to determine the M quality values of the received signals 20.

In an alternative embodiment, it is possible to provide all or individual IF stages with an amount, P, or possible frequency signal values that is less than all of the N×M total amount of the possible frequency values. As such, only a corresponding amount, P, of quality signals would be determined. To then achieve all of the N×M possible antenna/frequency combinations, it would be necessary to calculate any missing values, for example, by interpolation.

Although the present invention has been shown and described with respect to several preferred embodiments thereof, various changes, omissions and additions to the form and detail thereof, may be made therein, without departing from the spirit and scope of the invention.

What is claimed is:

1. A method for selecting one of N antennas and one of M alternative receiving frequencies to determine an optimal antenna and frequency combination, the method comprising the steps of:

providing a plurality of N tuners, each tuner being associated with a corresponding one of the N antennas;

adjusting a receiving frequency of each of the N tuners to each of the M alternative receiving frequencies;

receiving a quality signal from each of the N tuners for each of the M alternative receiving frequencies that each of the N tuners is adjusted to;

receiving a tuner output signal from each of the N tuners for each of the M alternative receiving frequencies that each of the N tuners is adjusted to;

selecting one of the plurality of quality signals having a predetermined optimal quality criteria at one of the M alternative receiving frequencies;

selectively multiplex switching one of the plurality of tuner output signals based on the selected one of the quality signals having the predetermined optimal quality criteria at one of the M alternative receiving frequencies; and analog-to-digital converting the selectively multiplex switched tuner output signal and providing the digital converted signal to a digital signal processor for signal processing.

2. The method of claim 1, where the step of selecting one of the plurality of quality signals further comprises the step of selectively switching the one of the plurality of quality signals having the predetermined optimal quality criteria, where the step of selectively switching is performed at each one of the M alternative receiving frequencies.

3. An apparatus for selecting one of a plurality, N, of antennas and one of a plurality, M, of alternative receiving frequencies to determine an optimal antenna and frequency combination, where each of the N antennas is connected to a signal input of a corresponding IF stage, a frequency output signal from each of the N IF stages is connected with a corresponding frequency input of a multiplex switch, an output of the multiplex switch is connected with an analog-to-digital converter, an output of the analog-to-digital converter is connected with an input of a digital signal processor, where each IF stage provides a quality output signal indicative of a receiving quality of the corresponding antenna, where the N quality output signals are connected to the digital signal processor, where at least one control output signal of the digital signal processor is coupled with each one of N control inputs of the N IF stages for setting the receiving frequency thereof, and where a switch output of the digital signal processor is connected with the control input of the multiplex switch to select a certain one of the N frequency control signals at the frequency inputs of the multiplex switch to pass through to the digital signal processor.

4. The apparatus of claim 3, where the at least one control output signal of the digital signal processor is coupled with each one of the N control inputs of the N IF stages via a frequency control means for setting the receiving frequency thereof.

5. The apparatus of claim 4, where the frequency control means comprises a second multiplex switch having an input connected to the at least one control output signal of the digital signal processor and having a plurality, N, of outputs each connected with the corresponding one of the N control inputs of the N IF stages, the digital signal processor providing a signal to the second multiplex switch for control thereof.

6. The apparatus of claim 3, where the digital signal processor provides a plurality, N, of the control output signals, each of the control output signals coupled with each one of the N control inputs of each of the N IF stages for setting the receiving frequency thereof.

7. The apparatus of claim 3, where each IF stage comprises a mixer, a phase loop control circuit and an oscillator.

8. The apparatus of claim 7, where the IF stages are integrated in a module.

9. The apparatus of claim 3, where the IF stages, the multiplex switch, the analog-to-digital converter, the digital signal processor, and the demodulator are integrated in a module.

10. The apparatus of claim 3, where the N quality output signals are connected to corresponding inputs of a third multiplex switch having an output connected to the digital signal processor, the digital signal processor providing a signal to the third multiplex switch for control thereof.

11. The apparatus of claim 3, where the digital signal processor provides the at least one control output coupled with each one of the N control inputs of the N IF stages for setting the receiving frequency thereof such that the N IF stages are simultaneously set to the same receiving frequency at any one moment in time.

12. The apparatus of claim 3, where the digital signal processor is operable to provide the at least one control output coupled with each one of the N control inputs of the N IF stages for setting the receiving frequency thereof such that the N IF stages are simultaneously set to different receiving frequencies at any one moment in time.

13. An apparatus for selecting one of N antennas and one of M alternative receiving frequencies to determine a best antenna and frequency combination, comprising:
 first means for determining N×M antenna/frequency combinations;
 second means for determining quality of a received antenna signal for each of the N×M antenna/frequency combinations;
 means for comparing the received signal qualities;
 means for selecting one of the N×M antenna/frequency combinations having the best received signal quality; and
 means for analog-to-digital converting the selected one of the N×M antenna/frequency combinations having the best received signal quality and for providing the analog-to-digital converted signal to a digital signal processor for signal processing.

14. The apparatus of claim 13, where the second means for determining comprises means for determining a quality of a received antenna signal at each of the N×M antenna/frequency combinations, and where the means for comparing comprises means for comparing the N×M received signal qualities.

15. A diversity radio receiver, comprising:
 a plurality of dynamically adjustable tuners that each receives a received signal from a uniquely associated antenna and provides an associated IF signal and an associated IF quality signal;
 a switch that receives the plurality of IF signals and provides a switch output signal indicative of one of the IF signals in response to a switch control signal;
 an analog-to-digital converter that converts the switch output signal to a digitized signal; and
 a processor that receives the digitized signal and the plurality of IF quality signals and provides IF control signals to each of the intermediate frequency tuners and the switch control signal;
 where the IF control signals tune each of the tuners to a plurality of frequency values.

16. The diversity radio receiver of claim 15, where the processor compares the plurality of IF quality signals.

17. A diversity radio receiver, comprising:
 a plurality of dynamically adjustable tuners that each receives a received signal from a uniquely associated antenna and provides an associated IF signal and an associated IF quality signal;
 a first switch that receives the plurality of IF signals and provides a first switch output signal indicative of one of the IF signals in response to a first switch control signal; and
 a second switch that receives the plurality of IF quality signals and provides a second switch output signal indicative of one of the plurality of IF quality signals in response to a second switch control signal;
 a third switch that receives a frequency control signal and selectively routes the frequency control signal to a selected one of the plurality of dynamically adjustable tuners in response to a third switch control signal; and
 a processor that receives the first and second switch output signals and provides the frequency control signal and the first, second and third switch control signals.

* * * * *

UNITED STATES PATENT AND TRADEMARK OFFICE
CERTIFICATE OF CORRECTION

PATENT NO.         : 7,277,686 B2  
APPLICATION NO. : 10/890510  
DATED               : October 2, 2007  
INVENTOR(S)       : Gierl et al.

It is certified that error appears in the above-identified patent and that said Letters Patent is hereby corrected as shown below:

Column 3
line 11, delete "returning" and insert --retuning--
line 13, delete "returning" and insert --retuning--

Signed and Sealed this

Twenty-seventh Day of November, 2007

JON W. DUDAS
*Director of the United States Patent and Trademark Office*